(12) United States Patent
Yanagawa

(10) Patent No.: US 6,567,354 B2
(45) Date of Patent: May 20, 2003

(54) OPTICAL PICKUP DEVICE MINIMIZING AN UNDESIRABLE ASTIGMATISM

(75) Inventor: Naoharu Yanagawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/038,543

(22) Filed: Jan. 3, 2002

(65) Prior Publication Data

US 2002/0071365 A1 Jun. 13, 2002

Related U.S. Application Data

(62) Division of application No. 09/412,703, filed on Oct. 5, 1999, now Pat. No. 6,363,038.

(30) Foreign Application Priority Data

Oct. 6, 1998 (JP) ............................................. 10-283814

(51) Int. Cl.[7] .................................................. G11B 7/00
(52) U.S. Cl. ................................. 369/44.23; 369/53.19
(58) Field of Search ........................... 369/44.11, 44.15, 369/44.32, 53.19, 44.14, 44.23, 112.01, 112.03, 112.05

(56) References Cited

U.S. PATENT DOCUMENTS

| | | | | |
|---|---|---|---|---|
| 4,960,321 A | * | 10/1990 | Takahashi ................ | 369/44.11 |
| 5,008,873 A | * | 4/1991 | Tanaka et al. ........... | 369/44.15 |
| 5,267,089 A | * | 11/1993 | Yamamoto et al. ...... | 369/44.16 |
| 5,488,594 A | * | 1/1996 | Kobayashi et al. ...... | 369/44.14 |

* cited by examiner

*Primary Examiner*—Paul W. Huber
(74) *Attorney, Agent, or Firm*—Perman & Green, LLP

(57) ABSTRACT

An optical pickup device comprises an objective lens unit having an objective lens, a support member for supporting the objective lens and an objective-lens driving mechanism for driving the objective lens in a radial direction and a focusing direction of an optical disc in such a way that a light beam is focused on an information recording surface of the optical disc; and a main unit having an optical irradiation system which includes a light source for emitting a light beam and guides the light beam to the objective lens, and an optical detection system which includes a photo-sensor and guides reflected light from the information recording surface to the photo-sensor via the objective lens. The optical pickup apparatus further has a tilt-position-adjusting mechanism for supporting the objective lens unit on the main unit and tilting an optical axis of the objective lens with respect to an optical axis of the optical irradiation system in such a way as to minimize an undesirable astigmatism given by the optical disc and optical elements in the optical irradiation system and the optical detection system.

17 Claims, 16 Drawing Sheets

OPTICAL PICKUP DEVICE MINIMIZING AN UNDESIRABLE ASTIGMATISM

This application is a divisional of U.S. application Ser. No. 09/412,703, filed Oct. 5, 1999, now U.S. Pat. No. 6,363,038.

BACKGROUND OF THE INVENTION

1. Field of the Invention

The present invention relates generally to an optical pickup device for use in an optical information recording/reproducing apparatus that records and/or reproduces signals from an optical information medium such as an optical disc.

2. Description of the Related Art

For a recording/reproducing apparatus for recording/reproducing information on an optical disc, loaded therein, such as an optical video disc, a digital audio disc, and so on, a focus servo and a tracking servo are essential for always accurately converging light beams for writing and reading information to a pit train or the like formed spirally or concentrically on a recording surface of the optical disc. The focus servo performs a positional control for an objective lens, used to irradiate a pit train on the optical disc with light beams, in an optical axis direction so as to reduce a focus error, i.e., an error of the position of the objective lens in the optical axis direction with respect to the focus position of the objective lens. The tracking servo performs a positional control for the position of the objective lens, used to irradiate a pit train on the optical disc with a light beams, with respect to a recording track in a radial direction of the optical disc, so as to reduce a tracking error, i.e., an error of the objective lens with respect to the pit train recording track position.

FIG. 1 illustrates a conventional optical pickup device using the astigmatism method.

A laser beam from a semiconductor laser 1 is transformed into a parallel laser beam by a collimator lens 2, passes through a polarizing beam splitter 3, and is converged by an objective lens 4 toward an optical disc 5 to form a light spot onto a pit train on an information recording surface of the optical disc 5.

Light reflected from the optical disc 5 is converged by the objective lens 4 and directed by a beam splitter 3 to a detecting lens 7. A converged light beam formed by the detecting lens 7 passes through a cylindrical lens 8, serving as an astigmatism generating element, to form a spot image near the center 'O' of a light receiving surface of a quadrant photodetector 9 having four light receiving surface areas (elements) divided by two orthogonal line segments. The cylindrical lens 8 irradiates the quadrant photodetector 9 with a light spot SP in the shape of true circle as illustrated in FIG. 2A when the laser beam is converged on the recording surface of the optical disc 5 in focus, and an elliptic light spot SP, extending in an orthogonal direction of the elements as illustrated in FIG. 2B or 2C when the converged laser beam is out of focus on the recording surface of the optical disc 5 (FIG. 2B illustrates the light spot SP when the objective lens 4 is too far from the optical disc 5, while FIG. 2C illustrates the light spot SP when the objective lens 4 is too near the optical disc 5), thus generating so-called astigmatism.

The quadrant photodetector 9 opto-electrically transduces the light spot irradiated to the four light receiving surface areas into respective electric signals which are supplied to a focus error detecting circuit 12. The focus error detecting circuit 12 generates a focus error signal (FES) based on the electric signals supplied from the quadrant photodetector 9 and supplies the focus error signal to an actuator driver circuit 13. The actuator driver circuit 13 supplies a focusing driving signal to an actuator 15. The actuator 15 moves the objective lens 4 in response to the focusing driving signal in the optical axis direction.

The focus error detecting circuit 12, as illustrated in FIG. 3, is connected to the quadrant photodetector 9, where the quadrant photodetector 9 is composed of four detecting elements DET1 to DET4 in first to fourth quadrants which are located adjacent to each other with two orthogonal division lines L1 and L2 interposed therebetween and which are independent of each other. The quadrant photodetector 9 is positioned such that the division line L2 is in parallel with a tangential direction with respect to the extending direction of the recording track, and the other division line L1 is in parallel with the radial direction of the same. Respective opto-electrically transduced outputs from the elements DET1 and DET3, symmetric with respect to the center 'O' of the light receiving surface of the quadrant photodetector 9, are added by an adder 22, while respective opto-electrically transduced outputs from the elements DET2 and DET4, also symmetric with respect to the center 'O' of the light receiving surface, are added by an adder 21, and outputs from the respective adders 21 and 22 are supplied to a differential amplifier 23. The differential amplifier 23 calculates the difference between the supplied signals, and outputs a signal indicative of the difference therebetween as a focus error signal (FES).

As described above, in the conventional focus error detecting circuit 12, the outputs of the quadrant photodetector 9 are added by the adders 21 and 22, respectively, and the differential amplifier 23 calculates the difference between the outputs of the adders 21 and 22 to generate a focus error component. In this event, when the light beam is in focus, the light spot in the shape of true circle as illustrated in FIG. 2A is formed on the quadrant photodetector 9, where a spot intensity distribution is symmetric with respect to the center 'O' of the light receiving surface of the quadrant photodetector 9, i.e., symmetric in the tangential direction and in the radial direction, so that the values resulting from the additions of the opto-electrically transduced outputs from the elements on the diagonals are equal to each other, with the focus error component being calculated to be "zero". On the other hand, when the light beam is out of focus, i.e., an elliptic light spot extending in a diagonal direction as illustrated in FIG. 2B or 2C is formed on the quadrant photodetector 9, so that the values resulting from the additions of the opto-electrically transduced outputs from the elements on the diagonals are different from each other. Thus, the focus error component output from the differential amplifier 23 exhibits a value corresponding to the focus error. Specifically, assuming that the references designated to the elements of the quadrant photodetector 9 represent the outputs thereof, the focus error signal FES is expressed by the following equation:

$$FES=(DET1+DET3)-(DET2+DET4)$$

Since the objective lenses of conventional CD players have a small numerical aperture and a large focal depth, slight noise if appeared on a focus error signal (FES) would be negligible as a focus error. In a case where information is read from an optical disc having lands and grooves, such as a DVD-RAM, however, the numerical aperture of the objective lens becomes larger and the focal depth thereof becomes shallower, so that the influence of noise contained in the focus error signal on the focus servo of the objective lens becomes greater.

In conventional optical pickup apparatuses which read information from an optical disc having pre-grooves, therefore, the focus servo system cannot follow up noise on an FES, thus raising problems like oscillation of the focus servo circuit and heating of the actuator.

OBJECT AND SUMMARY OF THE INVENTION

Accordingly, the present invention has been made in view of the problem mentioned above, and thus an object thereof is to provide an optical pickup apparatus capable of adequately eliminating noise from a focus error signal that is generated at the time a light spot crosses a track or groove in the astigmatism method, particularly, the noise component that is originated from a further astigmatism of the optical system or birefringence of the substrate of an optical disc.

An optical pickup device according to the present invention comprises an objective lens unit having an objective lens, support means for supporting the objective lens and an objective-lens driving mechanism for driving the objective lens in a radial direction and a focusing direction of an optical disc in such a way that a light beam is focused on an information recording surface of the optical disc; a main unit having an optical irradiation system which includes a light source for emitting a light beam and guides the light beam to the objective lens, and anoptical detection system which includes photosensing means and guides reflected light from the information recording surface to the photosensing means via the objective lens; and tilt-position-adjusting means for supporting the objective lens unit on the main unit and tilting an optical axis of the objective lens with respect to an optical axis of the optical irradiation system in such a way as to minimize an undesirable astigmatism given by the optical disc and optical elements in the optical irradiation system and the optical detection system.

In the optical pickup device having the structure above mentioned, said tilt-position-adjusting means includes a supporting structure for fixing the objective lens unit at least two points onto said main unit after the adjustment of position for tilting said objective lens unit is performed on the main unit using at least one screw at one of the points.

In the optical pickup device having the structure above mentioned, said supporting structure is that said objective lens unit is fixed on said main unit at three points which do not lie in a straight line, at one point of which said objective lens unit is anchoringly in contact with the main unit, and at remaining two points of which the adjustments of position for said objective lens in the tilting are performed with two screws, so that the optical axis of the objective lens is tilted toward one of a pair of regions including the vertical angles of the first to fourth quadrants defined by the tangential and radial directions of the optical disc all around the optical axis of the optical irradiation system on the main unit.

In the optical pickup device having the structure above mentioned, said supporting structure is that said objective lens unit is fixed on said main unit at two points, at one point of which said objective lens unit is anchoringly in contact with the main unit, and at a remaining points of which the adjustments of position for said objective lens in the tilting are performed with a screw, so that the optical axis of the objective lens is tilted toward one of a pair of regions including the vertical angles of the first to fourth quadrants defined by the tangential and radial directions of the optical disc all around the optical axis of the optical irradiation system on the main unit.

Another optical pickup device according to the present invention comprises:

an objective lens;

support means for supporting said optical lens;

an objective-lens driving mechanism for driving said objective lens in a radial direction and a focusing direction of an optical disc in such a way that a light beam is focused on an information recording surface of said optical disc;

an optical irradiation system which includes at least one light source for emitting a light beam and guides said light beam to said objective lens;

an optical detection system which includes photosensing means and guides reflected light from said information recording surface to said photosensing means via said objective lens; and shift-position-adjusting means for shifting an optical axis of a light beam irradiated from said light source with respect to an optical axis of said optical irradiation system so that an optical axis of said objective lens is tilted with respect to an optical axis of said optical irradiation system so as to minimize an undesirable astigmatism caused from said optical disc and optical elements in said optical irradiation system and said optical detection system.

In the optical pickup device having the structure above mentioned, said shift-position-adjusting means including screwing mechanisms for moving the optical axis of the light source in directions corresponding to the tangential and radial directions of the optical disc from the optical axis of the optical irradiation system individually.

In the optical pickup device having the structure above mentioned, said shift-position-adjusting means including a screwing mechanism for moving the optical axis of the light source in a direction which does not correspond to the tangential and radial directions of the optical disc from the optical axis of the optical irradiation system.

In the optical pickup device having the structure above mentioned, said optical irradiation system including; a collimator lens converting a diverging light beam irradiated from the semiconductor laser to a parallel light; and a complex prism guiding the parallel light beam to the objective lens while shaping a cross-section of the light beam and having a partial function of the optical detection system as to guide a reflected light from the optical disc to said optical detection system.

In the optical pickup device having the structure above mentioned, said photosensing means which comprises; an astigmatism generating element giving astigmatism the reflected light; and a quarter-split photosensor having at least four elements arranged in a point symmetrical to one another with respect to the center of a light-receiving surface.

In the optical pickup device having the structure above mentioned, the optical pickup device further comprises a diffraction-grating element which forms two light spots from plus and minus first-order light beams that are irradiated in a point symmetrical fashion around a 0-th order light spot in a middle distance between the two light spots.

In the optical pickup device having the structure above mentioned, the optical pickup device further comprises rotational adjusting means which rotates the diffraction-grating element with respect to the optical axis of the optical irradiation system in such a manner that the radial component of the distance between the centers of the two light spots becomes ½ of a track pitch of the optical disc.

In the optical pickup device having the structure above mentioned, said astigmatism generating element is one of selected form a cylindrical lens, hologram element and parallel transparent plate.

The optical pickup apparatus of the present invention adjusts the angular position of the objective lens itself to allow a light beam to obliquely enter the objective lens, providing an image height which produces an astigmatism to nearly minimize the undesirable astigmatism of optical elements in the optical irradiation system and optical detection system and an optical disc, so that a noise component originated from the astigmatism or the birefringence of the substrate of the optical disc can be adequately eliminated from the focus error signal.

DETAILED DESCRIPTION OF THE PREFERRED EMBODIMENTS

Preferred embodiments according to the present invention will now be described with reference to the accompanying drawings.

An undesirable astigmatism in an optical pickup apparatus occurs in a case of low alignment precision where, for example, the light-beam transmitting surface of an optical part like a diffraction grating or a half mirror is inclined and not perpendicular to the optical axis of an outgoing light beam or in a case where the outgoing light beam from a semiconductor laser itself has an astigmatism, or an astigmatism is also produced by the birefringence of the disc's substrate which is originated from the irradiation and reflection of a light beam.

An astigmatism component for which a meridional image point or sagittal image point is stretched in the tangential (track) direction or radial direction of an optical disc can be canceled out by, for example, slightly diffusing or converging the light beam that comes into a shaping prism. However, a so-called oblique astigmatism component for which a meridional image point or sagittal image point is stretched in a direction of, for example, 45° to the tangential (track) direction or radial direction of an optical disc remains in the overall optical system. When a condensed light beam is irradiated on a disc substrate made of polycarbonate (PC), for example, an astigmatism in an oblique direction of 45° to the tangential (track) direction or radial direction of the optical disc appears.

We have checked the noise component which is originated from an astigmatism in an oblique direction of 45° to the tangential (track) direction or radial direction and is produced when a light beam crosses a land and a groove in a case where a focus error signal is acquired from a quarter-split photosensor in an optical pickup apparatus which reproduces signals from an optical disc having grooves and lands formed on the information recording surface using the astigmatism method.

Figure 1:
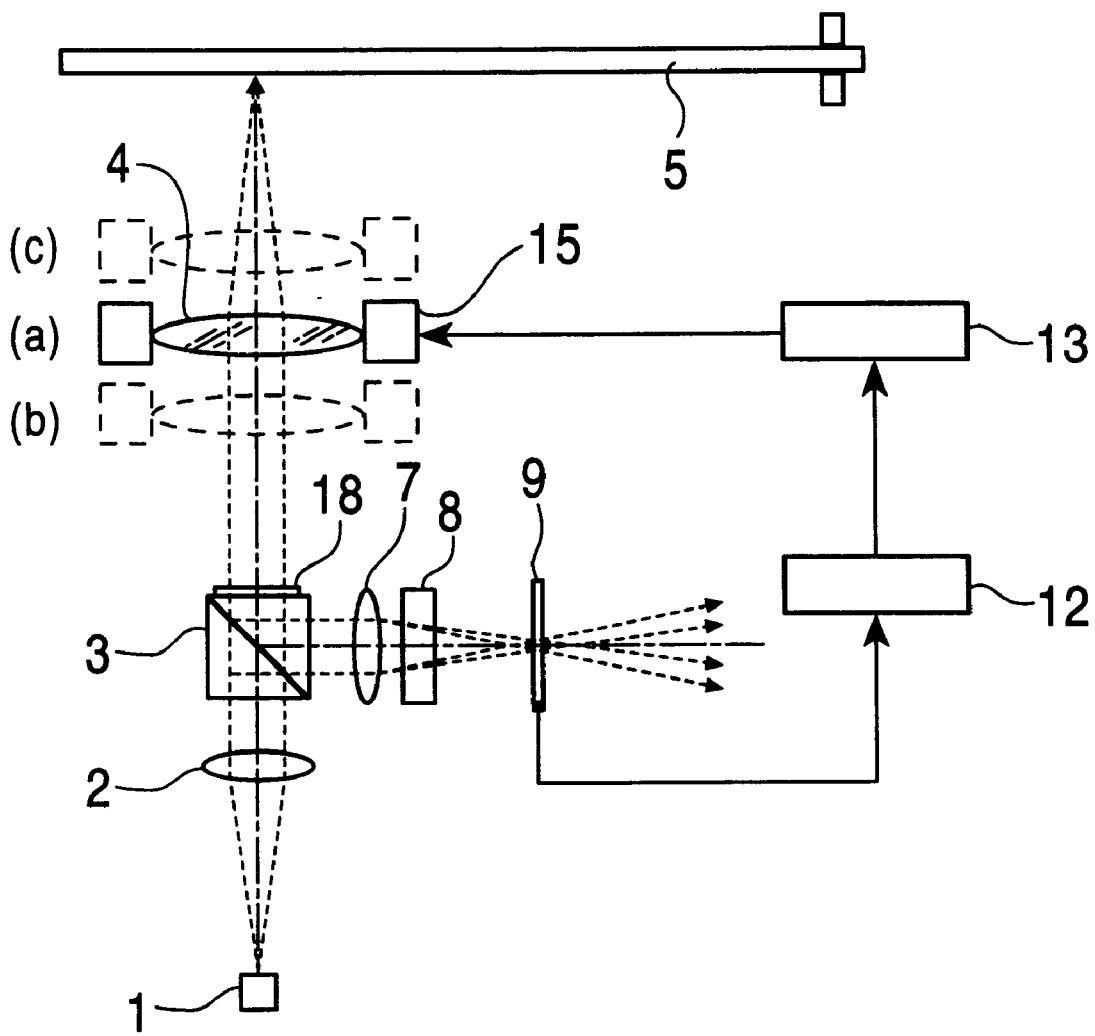
FIG. 1 is a schematic diagram illustrating the structure of an optical pickup device.
Figure 2:
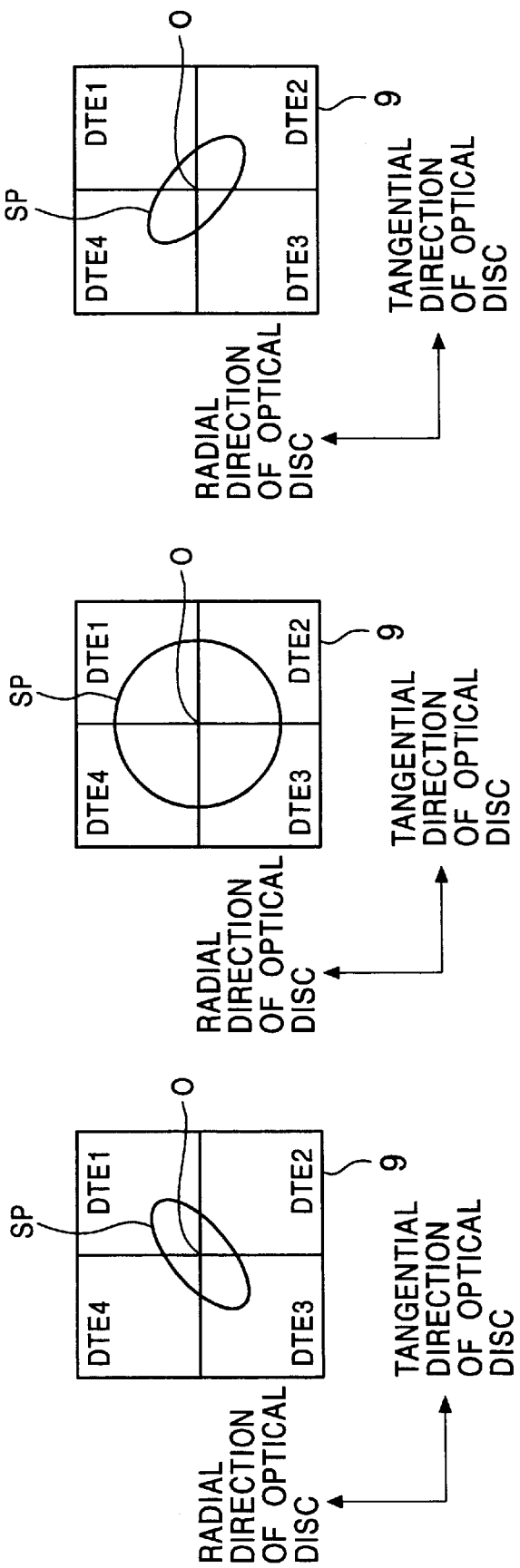
FIGS. 2A, 2B and 2C are plan views each illustrating a variation in shape of a beam spot on a light receiving surface of a photodetector.
Figure 3:
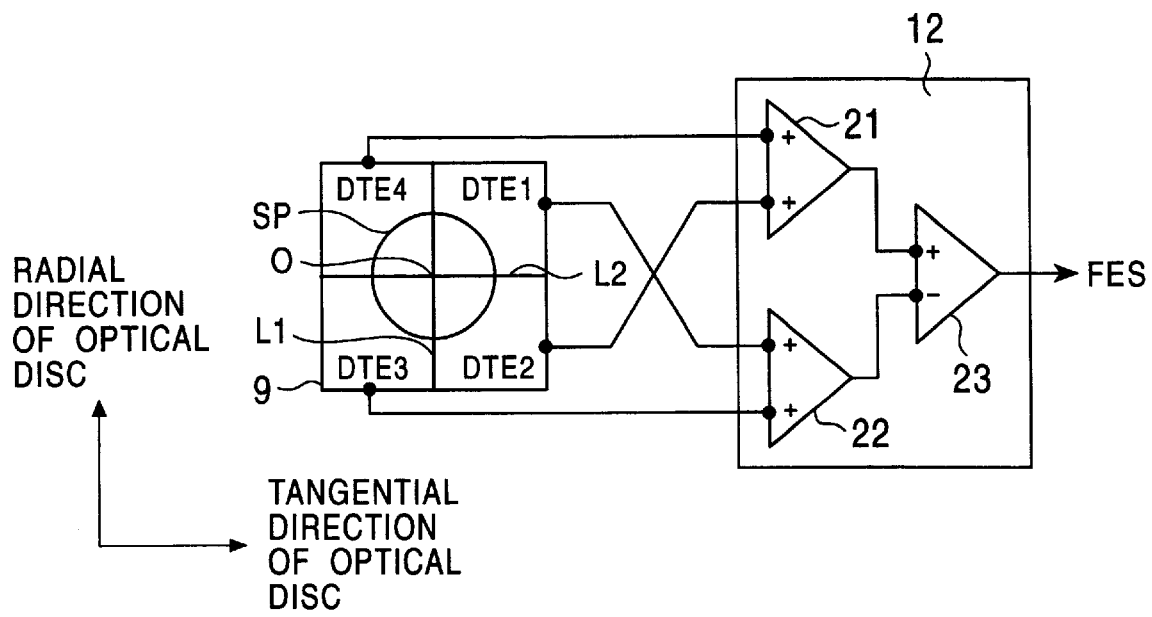
FIG. 3 is a schematic block diagram illustrating a focus error signal generator in a conventional optical pickup device.
Figure 4A:
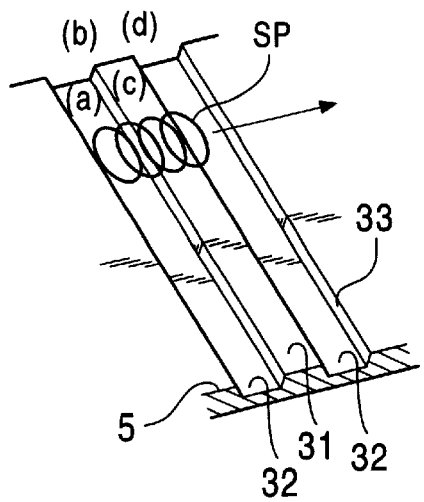
FIGS. 4A and 4B are schematic partial perspective views of the surface of an optical disc and a light beam, illustrating how a light spot which moves in the radial direction of the optical disc is formed.
Figure 4B:
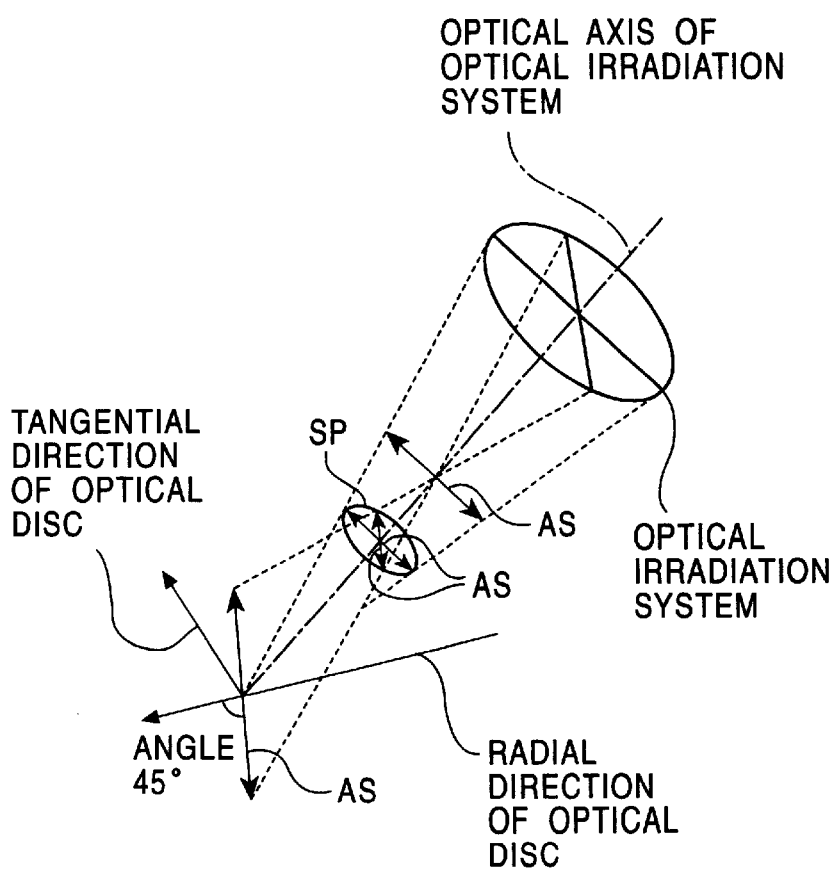

First, as shown in FIG. 4A, a light beam is irradiated by an optical irradiation system on lands 31 and grooves 32 formed spirally or concentrically on the information recording surface of an optical disc 5, forming a light spot SP, the light spot SP is moved in the radial direction from (a) to (d) as indicated by the broken-line arrow, and a check is made on FES noise on the focus error signal as the light spot moves across the track. It is to be noted however that the optical irradiation system which produces an astigmatism AS in the light spot SP in a direction of 45° to the track direction or the tangential direction as shown in FIG. 4B and a DVD-RAM optical disc comprised of a polycarbonate (PC) disc substrate are used. The groove width and the land width of the optical disc 5 are equal to each other. The photosensing means is a quarter-split photosensor 9 which comprises at least four elements arranged in a point symmetrical to one another with respect to the center of the light-receiving surface which are placed in the first to fourth quadrants into which the light-receiving surface is divided in association with the tangential and radial directions of the optical disc around the optical axis of the optical detection system as the center, as similar to FIG. 3.

Figure 5A:
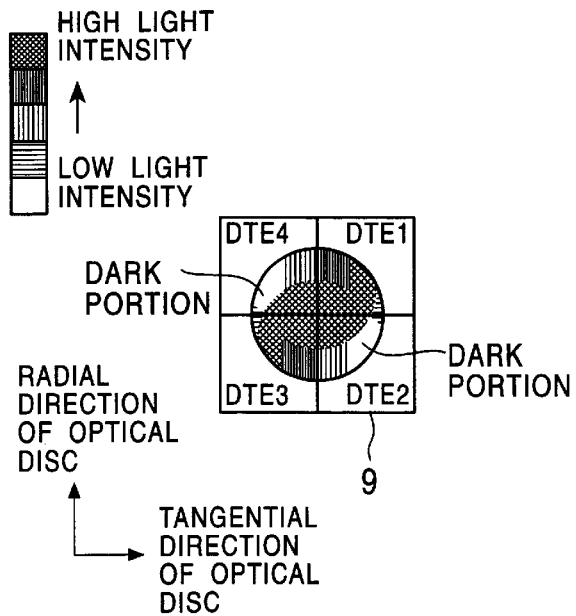
FIGS. 5A through 5D are plan views each showing the distribution of the intensities of light spots on the light-receiving surface of a photosensor in an optical pickup apparatus which is formed by the reflected light that has caused an oblique astigmatism.
Figure 5B:
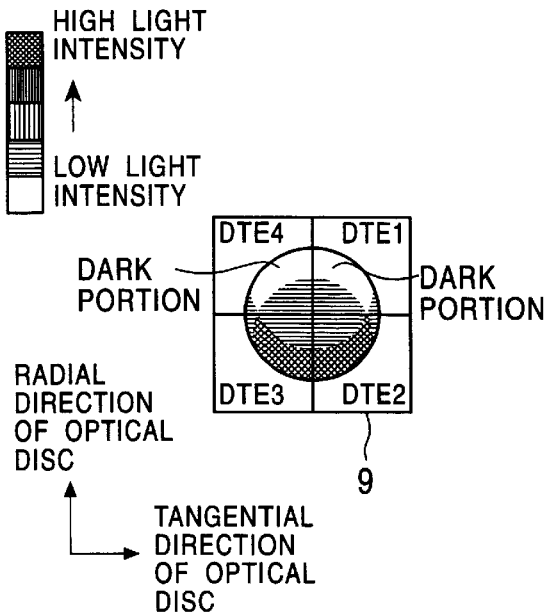
Figure 5C:
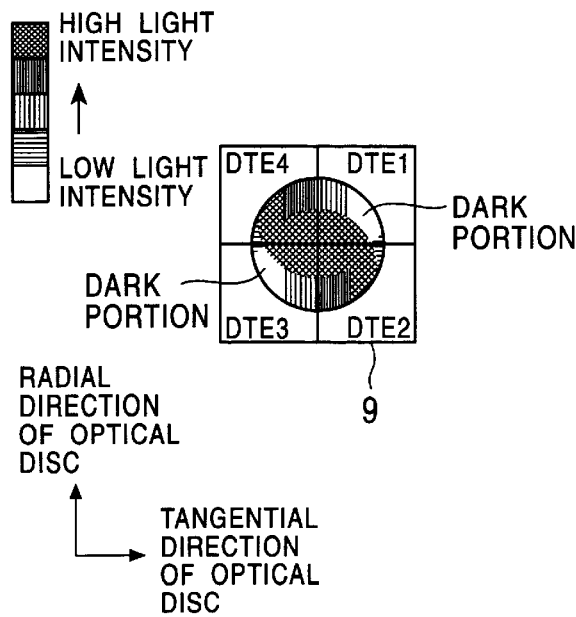
Figure 5D:
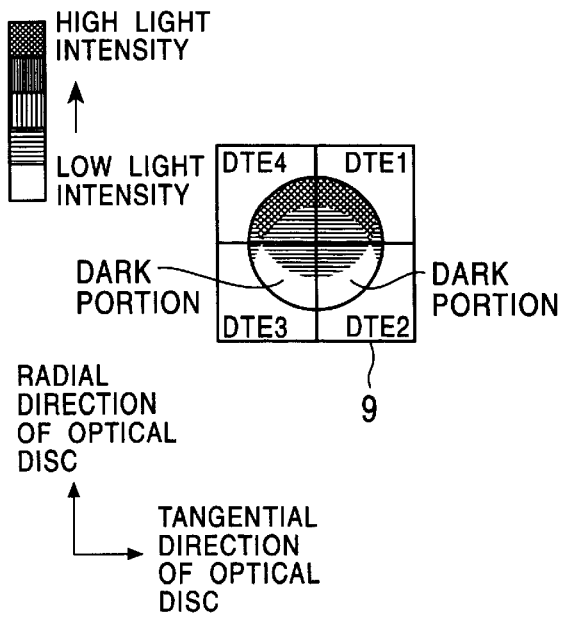

FIGS. 5A through 5D show the distribution of the intensities of light spots to be formed on the light-receiving surface of the quarter-split photosensor 9 in the respective cases where the light spot SP of a perfect circle when focussed is located at positions (a) to (d) in FIG. 4A. In the vicinity of the center of the groove 32, the distribution becomes as shown in FIG. 5A and dark portions appear in a DET 4 and DET 2 so that the focus error signal (FES) becomes maximum from the equation of the FES, FES= (DET1+DET3)−(DET2+DET4). When the light spot SP further moves and comes near a taper 33 at the boundary between the groove 32 and the land 31, the distribution becomes as shown in FIG. 5B and the FES becomes zero. As the light spot SP further moves and comes near the center of the land 31, the distribution becomes as shown in FIG. 5C and dark portions appear in a DET 1 and DET 3 so that the FES becomes minimum. As the light spot SP further moves and comes near another taper at the land-groove boundary, the distribution becomes as shown in FIG. 5D and the FES becomes zero. As the light spot SP further moves and comes near the center of another groove, the distribution becomes as shown in FIG. 5A again, yielding the maximum FES. As apparent from the above, a track cross signal which has the maximum level and the minimum level respectively at the states shown in FIGS. 5A and 5C is produced and this variation becomes FES noise. When a light spot in a focused state crosses a groove and a land, the FES should be equal to 0 ideally. However, the FES does not become zero because of the astigmatism in a direction of 45° to the track (tangential) direction. Therefore, a track cross signal appears on the FES which repeatedly reaches the maximum and minimum levels during the crossing of spot on the grooves and lands.

Figure 6:
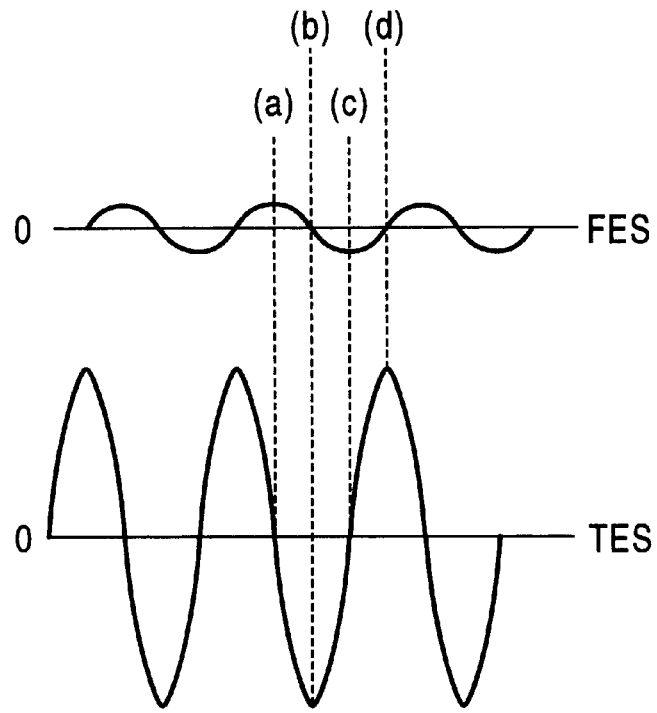
FIG. 6 is a graph showing the characteristics of noise in an FES from the photosensor in the optical pickup apparatus which is generated by the reflected light that has caused an oblique astigmatism.

As shown in FIG. 6, for example, as the tracking error signal FTS (DET1+DET4)−(DET2+DET3) and the reproduced signal RFS=(DET1+DET4+DET2+DET3) are detected, the phase of the FES output is deviated from the phases of those signal outputs, so that such a FES invites a defocusing of the device.

As mentioned above, we have reveal that such a deviation of the FES output is caused by the astigmatism in a direction of 45° to the track (tangential) direction. It is necessary to reduce the astigmatism in a direction of 45° to the track (tangential) direction in order to cancel out the deviation of the peak of the FES from the peaks of the FTS and RFS for eliminating the defocusing state.

According to the following first embodiment, the defocusing is eliminated by adequately setting the image height caused by the objective lens.

Figure 7:
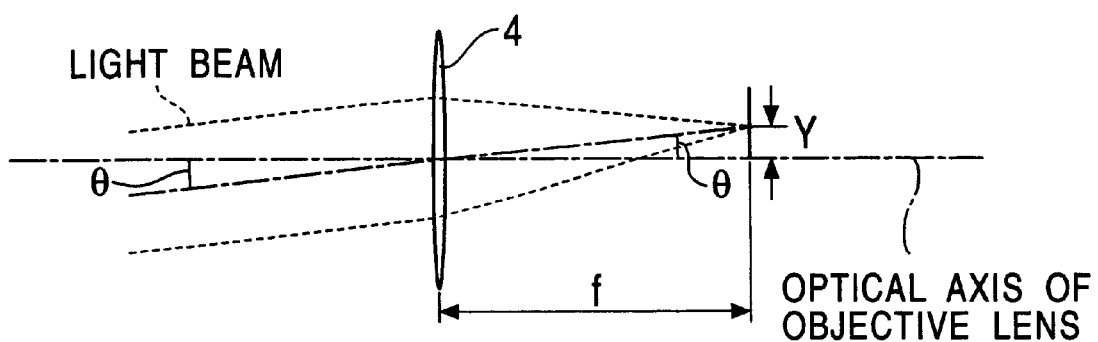
FIG. 7 is a schematic structural diagram depicting a relationship between the angle of view and image height caused by the objective lens of the optical pickup apparatus embodying the present invention.

When a parallel light beam enters the objective lens 4 having a focal distance f at an incident angle θ (angle of view) to the optical axis, the light beam is condensed on a point at an image height Y as shown in FIG. 7. In this case, the relationship between the angle of view θ and the image height Y caused by the objective lens 4 is Y=f tan θ. The relationship is generally understood as follows: if an infinite distant object standing on the optical axis subtends the angle θ at the lens 4, then the image height Y is expressed as the size of the image formed in the focal plane determined by the chief ray of the light beam. In general, the astigmatism of the lens greatly depends on the image height Y caused by the objective lens. That is, the greater the image height becomes, the greater the astigmatism becomes. Therefore, the astigmatism in a direction of 45° to the track (tangential) direction can be canceled out by tilting the optical axis of the objective lens by the angle of view θ with respect to the focusing direction (i.e., the optical axis of the optical irradiation system) because of changing the image height Y caused by the objective lens.

Figure 8:
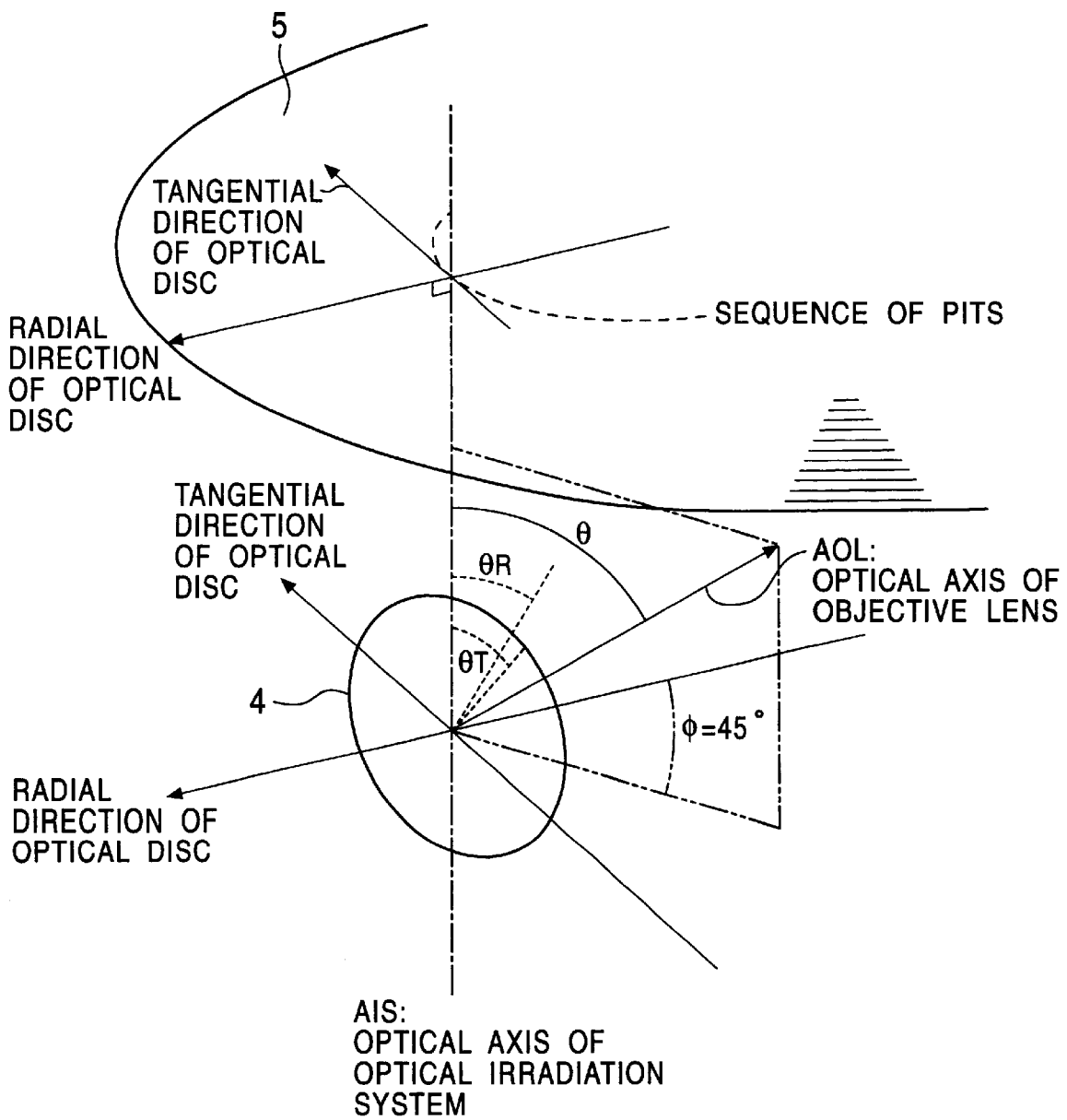
FIG. 8 is a schematic partial perspective view showing a relationship between the objective lens of the optical pickup apparatus embodying the present invention and an optical disc.

As shown in FIG. 8, the optical axis of the optical irradiation system AIS (which extends in the focusing direction) is set perpendicular to the recording surface of the optical disc 5 (i.e., the plane where the tangential direction and radial direction exist), and then the optical axis of the objective lens AOL is set to the angular position of the angle θ with respect to the optical axis of the optical irradiation system AIS within a plane 45 (two-dotted line) that extends in a direction of 45° (=φ) from the tangential and radial directions of the optical disc 5 including the optical axis of the optical irradiation system so as to alter the image height caused by the objective lens 4 in a direction of 45° from the track (tangential) direction. By adjusting the angle of view θ formed by the AOL and the AIS in the plane 45, the astigmatism in a direction of 45° to the track (tangential) direction can be canceled out, because the angle of view θ changes the image height Y caused by the objective lens. For example, the tilting position at the angle θ between the AOL and the AIS can be finely adjusted through the following steps of; setting the objective lens 4 in an initial state at which the principal plane of the objective lens is expected to be parallel to the recording surface of the optical disc 5 i.e., making the AOL coincide with the AIS; tilting the objective lens 4 from the initial state to a θ R angular position so that the AOL inclines from the AIS at an angle θR within a plane including the AIS and extending in a radial direction of the optical disc 5, and further tilting the objective lens 4 from the θ R angular position to a θ T angular position within the plane including the AIS and extending in the tangential direction of the optical disc 5 so that the AOL inclines from the AIS at the angle θ.

Figure 9:
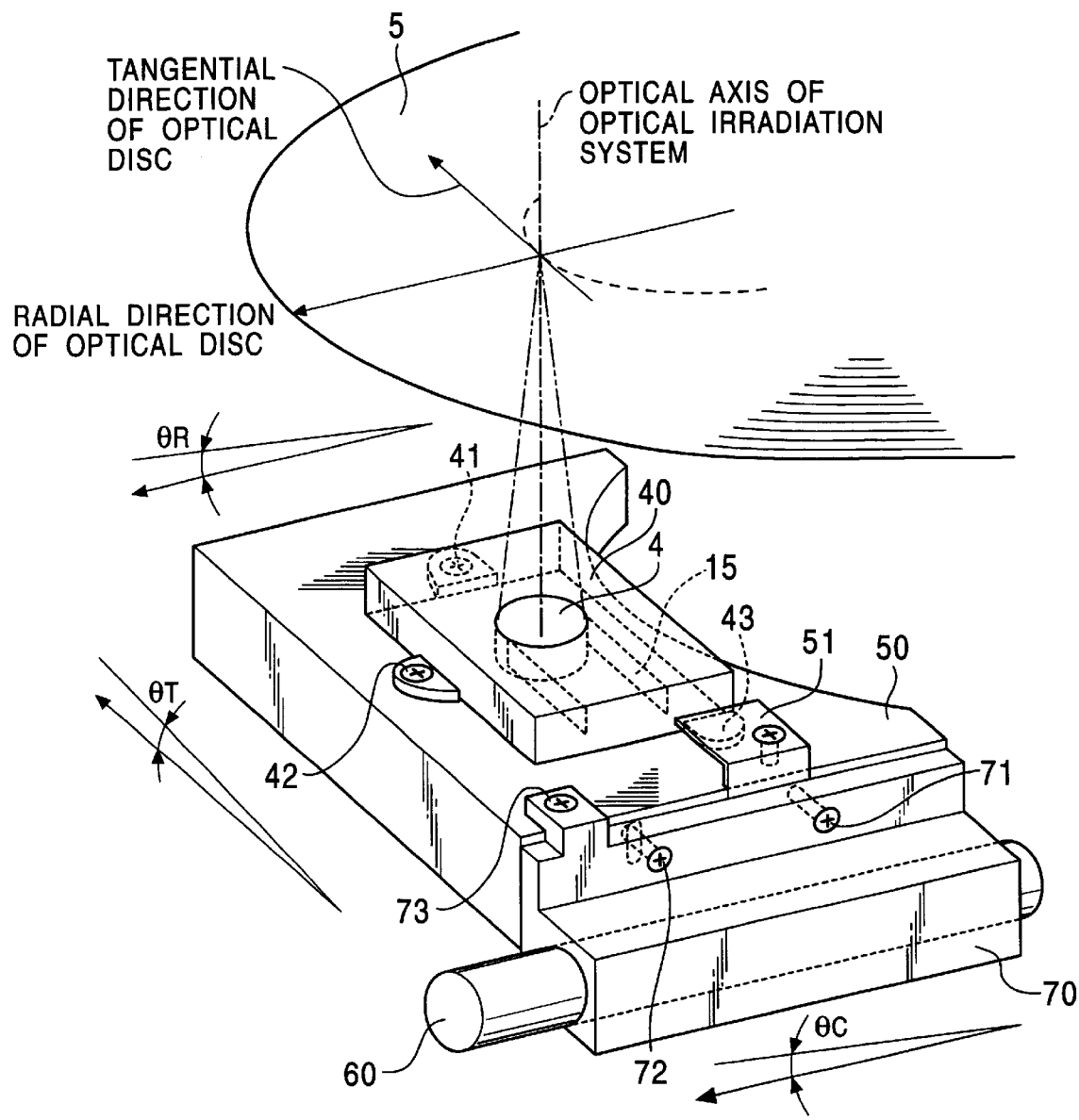
FIG. 9 is a schematic perspective view of the optical pickup apparatus of the present invention.

FIG. 9 shows an optical pickup apparatus embodying such a setting process for adjusting the angle of view θ. As shown in the Figure, the optical pickup apparatus comprises an objective lens unit 40 and a main unit 50. The main unit 50, that will be described later in details, has an optical irradiation system which includes a light source like a semiconductor laser for emitting a light beam and guides the light beam to the objective lens, and an optical detection system which includes photosensing means and guides reflected light from the information recording surface to the photosensing means via the objective lens.

Provided between the objective lens unit 40 and the main unit 50 is tilt-position-adjusting means which tilts the optical axis of the objective lens with respect to the optical axis of the optical irradiation system. The tilt-position-adjusting means may be structured as follows: The objective lens unit 40 is provided with two tongue portions projecting in the tangential and radial directions and including through-hole portions 41 and 42 respectively, which are positioned away from the optical axis of the optical irradiation system. The objective lens unit 40 also has a tongue portion including a point-of-support portion 43 located on the opposite to the optical axis of the optical irradiation system. There are female screw portions provided on the top of the main unit 50 correspondingly to the holes of the through-hole portion 41 and 42 in such a manner that the optical axis of the optical irradiation system approximately coincides with the optical axis of the objective lens 4. The point-of-support portion 43 is clamped and fixed to the main unit 50 by a flat spring 51 with a L-shaped section screwed on the main unit to be anchored thereon. In addition, the point-of-support portion 43 may be directly screwed on the main unit. The objective lens unit 40 is supported at three points on the main unit 50 by securely holding the point-of-support portion 43 and fastening the objective lens unit 40 at the through-hole portions 41 and 42 at tilted positions of a predetermined angle θ by screws.

The objective lens unit 40 includes the objective lens 4, elastic support members 15 like a flat spring, which supports the objective lens 4 on the objective lens unit 40, and an objective-lens driving mechanism like an actuator, which drives the objective lens 4 in the radial direction and the focusing direction of the optical disc 5 in such a way as to focus a light beam on the information recording surface of the optical disc 5. The objective lens 4 supported by the support member 15 is mounted on a holder, and the objective-lens driving mechanism has a coil which extends in the radial direction and the focusing direction and a magnetic circuit. The coil and magnetic circuit function in cooperation with the holder.

As shown in FIG. 9, the main unit 50 is secured to a slider 70 which moves on a shaft 60 extending in the radial direction of the optical disc 5. The slider 70 is provided with a tilting mechanism for tilting the main unit 50 at an angle θ C with respect to the axis of the shaft 60 in the plane in the radial direction of the optical disc 5 that includes the optical axis of the optical irradiation system. The tilting mechanism may comprise a fixing section 71, a tiltably fixing section 72 and a tilt adjusting section 73. In the fixing section 71, a female screw portion is provided on the side portion of the main unit 50 near the seat portion for the point-of-support portion 43 and a screw enters through a through hole of the slider 70 to the female screw portion. The tiltably fixing section 72 is located apart from the fixing section 71 in the radial direction of the optical disc 5. In the section 72, an elongated female screw portion of the main unit 50 is provided on the side portion of the main unit 50. A screw enters through another through hole of the slider 70 to the elongated female screw portion. The slider 70 is fastened by these screws to the main unit 50. At the tilt adjusting section 73, the position of the main unit 50 at the angle θ C in the extending direction of the slider 70 or the radial direction of the optical disc is set around the fixing section 71 by making the distal end of a bolt, fastened in a through hole formed in the overhang portion of the slider 70 which is provided apart from the fixing section 71 with the tiltably focusing direction 72 in between, in contact with the corresponding top portion of the main unit 50 and turning the bolt to move it in the focusing direction.

Figure 10:
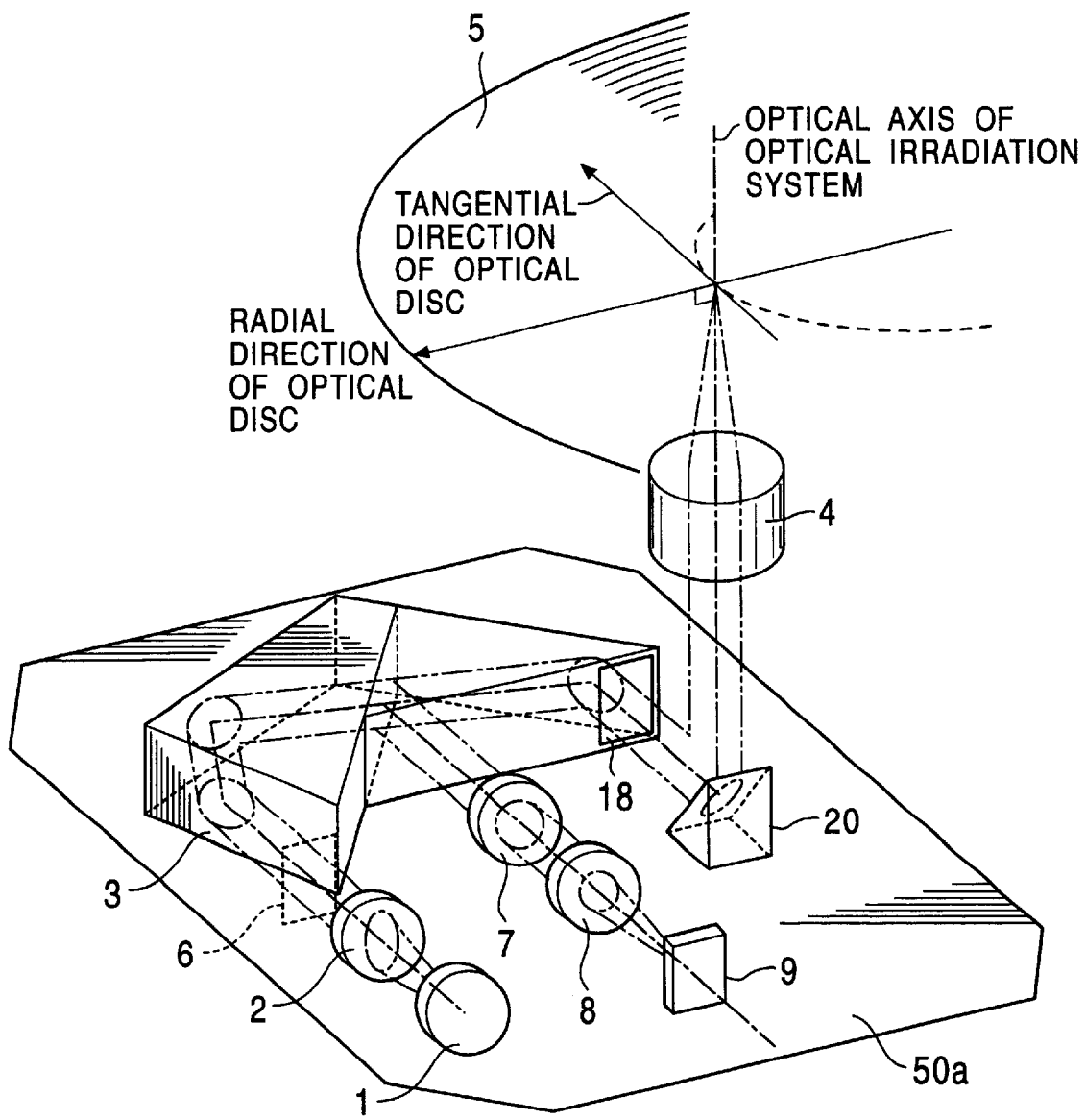
FIG. 10 is a schematic partial perspective view illustrating a relationship between an optical irradiation system and an optical detection system of the optical pickup apparatus of the present invention.
Figure 18:
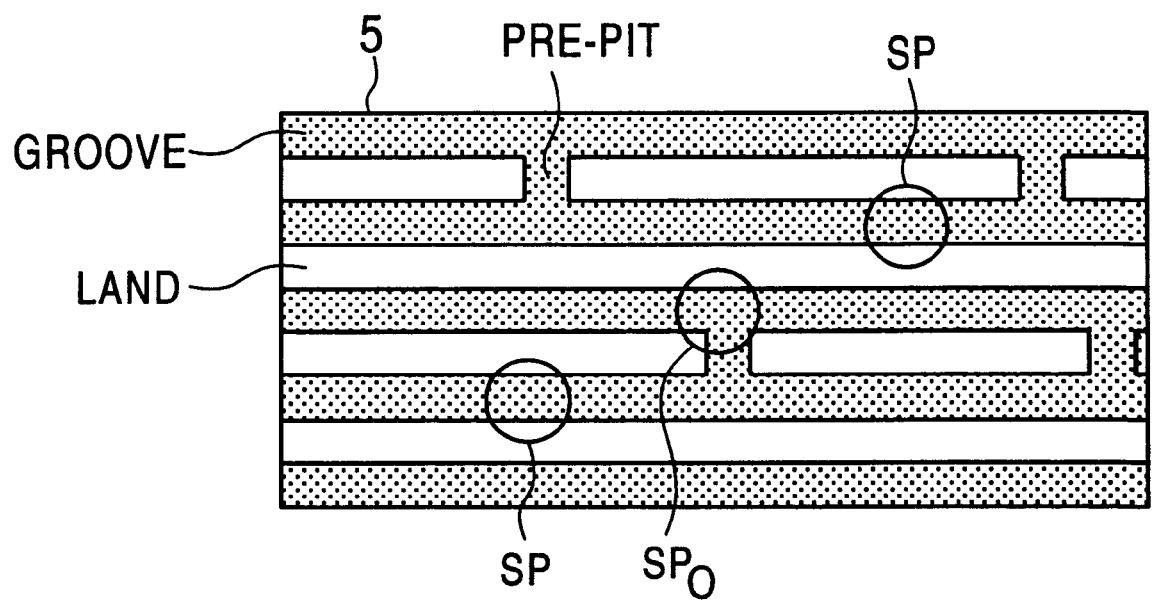
FIG. 18 is a schematic partial plan view of the surface of an optical disc having pre-pits recorded on lands.

FIG. 10 shows the inside of the main unit 50, as shown the Figure, in which an optical irradiation system and an optical detection system are provided an a base portion 50a of the main unit. The optical irradiation system comprises a semiconductor laser 1 for emitting linearly polarized light, a collimator lens 2 converting a diverging light beam irradiated from the semiconductor laser to a parallel light, a polarized-beam splitter 3, a ¼-wavelength plate 18 and a rising reflector 20. The optical detection system comprises the rising reflector 20, the ¼-wavelength plate 18, the polarized-beam splitter 3, a condenser lens 7 for detection, an astigmatism generating element 8 like a cylindrical lens, hologram element, parallel transparent plate or multi-lens, and the quarter-split photosensor 9. The polarized-beam splitter 3 is a complex prism which guides the parallel light beam passed the collimator lens 2 to the objective lens 4 while shaping a cross-section of the light beam and having a partial function of the optical detection system as to guide a reflected light from the optical disc to the quarter-split photosensor 9. A diffraction-grating element 6 like a 3-beam generating grating may be provided between the collimator lens 2 and the light-incident surface of the polarized-beam splitter 3 which is inclined to the optical path. This diffraction-grating element 6 forms two light spots SP from plus and minus first-order light beams that are irradiated in a point symmetrical fashion around a 0-th order light spot $SP_0$ in the middle of the distance between the light spots SP, on the information recording surface of the optical disc, as shown in FIG. 18. The optical disc 5 is designed in such a way that recording pits can be formed thereon in the form of either grooves or lands, and pre-pits have previously been recorded in the form of lands. It is possible to provide rotational adjusting means which irradiates two light spots in such a manner that the radial component of the distance between the centers of two light spots SP becomes ½ of the track pitch by turning the diffraction-grating element 6 with respect to the optical axis.

As shown in FIG. 10, the linearly polarized light beam emitted from the semiconductor laser 1 is transformed into parallel light by the collimator lens 2, is then shaped by the polarized-beam splitter 3, and is then circularly polarized by the ¼-wavelength plate 18. The circularly polarized light is deflected by the rising reflector 20 toward the objective lens 4 along the optical axis of the optical irradiation system approximately perpendicular to the optical disc 5, and is condensed by the objective lens 4, thus forming a light spot on the optical disc 5. The reflected light from the light spot travels through the objective lens 4 and the rising reflector 20 and reaches the ¼-wavelength plate 18 to be linearly polarized. This linearly polarized light is reflected by a dielectric multilayer film of the polarized-beam splitter 3, and is split and guided to the condenser lens 7. This light then passes through the astigmatism generating element 8 and enters the quarter-split photosensor 9. The optical head having a good reproduction characteristic can be constructed if the direction of the linearly polarized light (which is parallel to the junction surface in a case of a semiconductor laser) is perpendicular to the track direction. This is because the outgoing angle of the light beam which is perpendicular to the junction surface is greater than the outgoing angle which is parallel to the junction surface.

As the optical axis of the objective lens 4 is inclined with respect to the tangential direction and/or the radial direction of the optical disc, the astigmatism of the overall optical system from the light source to the optical disc can almost be minimized by making the astigmatism originated from the image height caused by the objective lens cancel out the astigmatisms the optical irradiation system, the optical detection system and the optical disc have.

Figure 11:
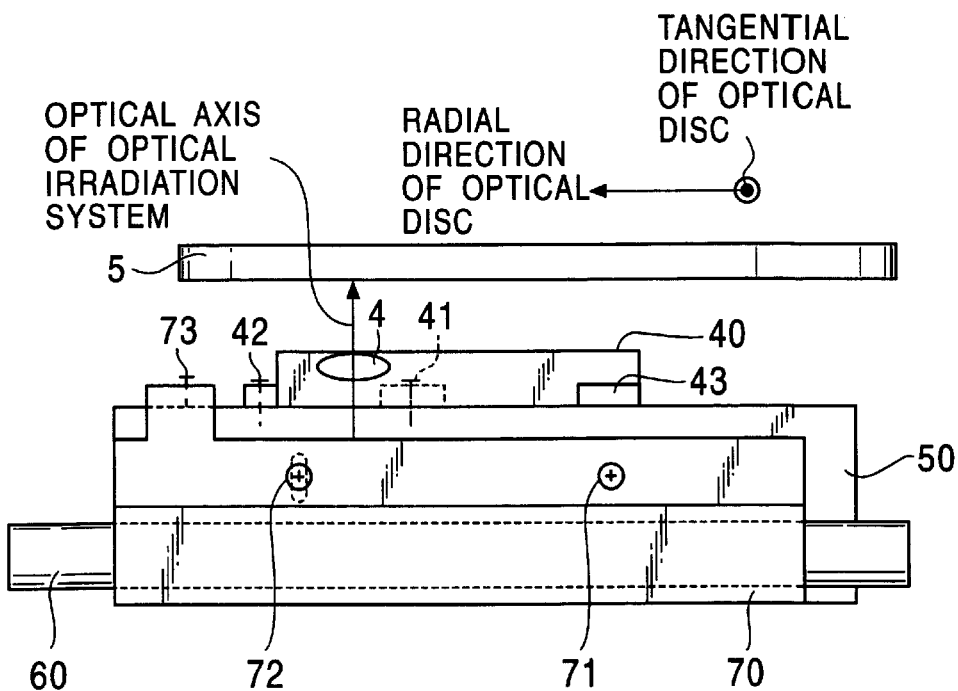
FIGS. 11 through 13 are schematic side views each showing the optical pickup apparatus of the present invention.

The operation of this embodiment will now be discussed. Adjustment of the optical pickup including adjustment of the tilted position of the objective lens is performed as follows. After the objective lens unit 40 and the main unit 50 are assembled as shown in FIG. 11 in the manufacturing procedures, it should be checked that the tracking error signal FTS and the reproduced signal RFS are acquired sufficiently. Next, it should be checked that the peak of the focus error signal FES is not deviated from those of the FTS and RFS. If there is no deviation in the signal peaks, then it is judged that the astigmatism produced in the optical path from the semiconductor laser 1 to immediately before the objective lens 4 is relatively small, or that the light beam incident to the objective lens 4 is not tilted much to the optical axis of the objective lens 4 and is condensed at a sufficiently low image height as compared with the effective field of view at the objective lens. If the astigmatism that is generated under such conditions is equal to or smaller than 0.01 λ rms, for example, approximately the smallest astigmatism is obtained, then the angular adjustment will not be carried out to complete the adjustment.

Figure 12:
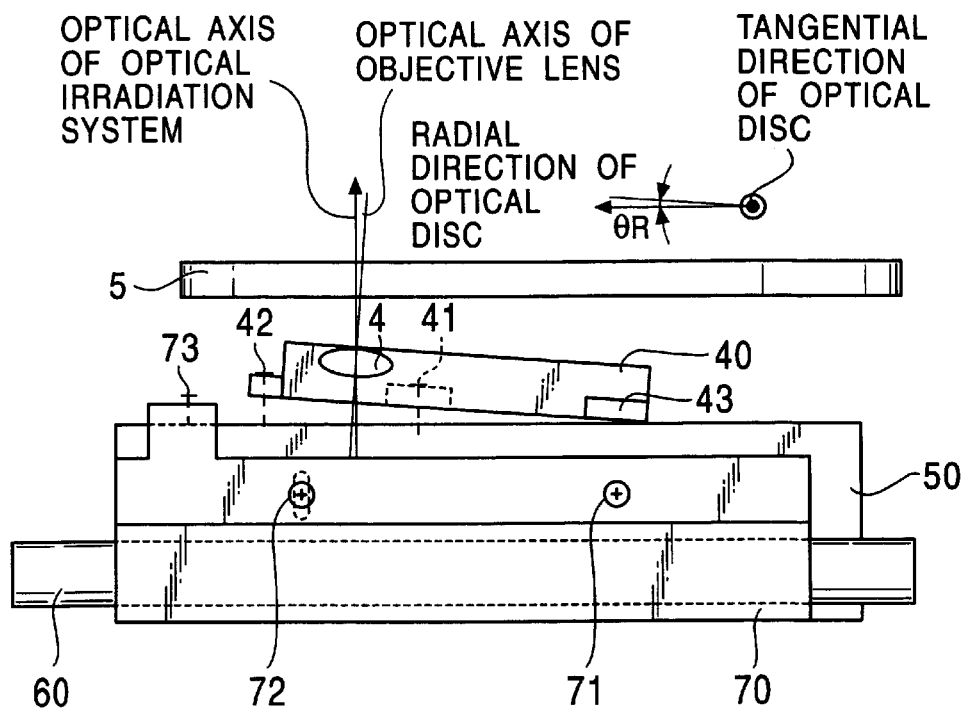

If the peak of the FES deviates from those of the FTS and RFS, on the other hand, then the tilt position of the objective lens 4 is adjusted to fix the objective lens 4 at the predetermined angle θ by setting the angular position of the objective lens unit 40 with respect to the main unit 50 to the angle θ T and the angle θ R in the tangential and radial directions by turning the screws in the tangential and radial through-hole portions 41 and 42 in such a way as to minimize the deviation of the FES, as shown in FIG. 12. Even if the astigmatism produced by the optical system is large as in this case, the astigmatism of the optical system can be minimized by adjusting and setting the angle θ to the optical axis of the objective lens 4 which sets the image height caused by the objective lens in such a manner that the astigmatism originated from the image height caused by the objective lens 4 cancels out the unwanted astigmatism caused by the other factors in the optical system. The optical axis of the objective lens 4 to be set to the angular position of the angle θ to the optical axis of the optical irradiation system can be set not only in the plane that extends in the direction of 45° from the tangential and radial directions of the optical disc 5 including the optical axis of the optical irradiation system but also in the plane that extends in a direction of such an arbitrary angle as to minimize the astigmatism by adjusting the angle θ T and the angle θ R. This embodiment can therefore minimize the oblique astigmatism of an arbitrary angle other than the oblique astigmatism of 45° which is produced in the optical system.

Figure 13:
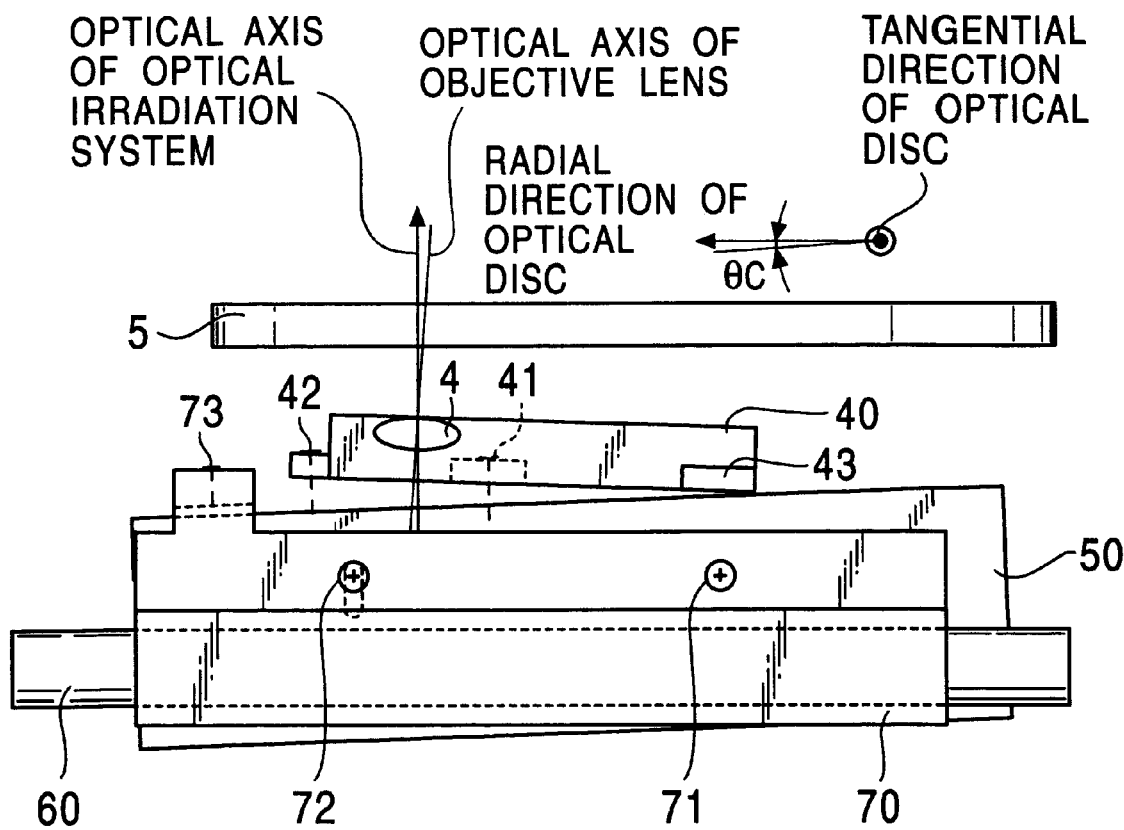

Thereafter, the main unit 50 is tilted at the angle θ C with respect to the axis of the shaft 60 by turning the screw at the tilt adjusting section 73 as shown in FIG. 13 to correct the comatic aberration of the objective lens 4.

Figure 14:
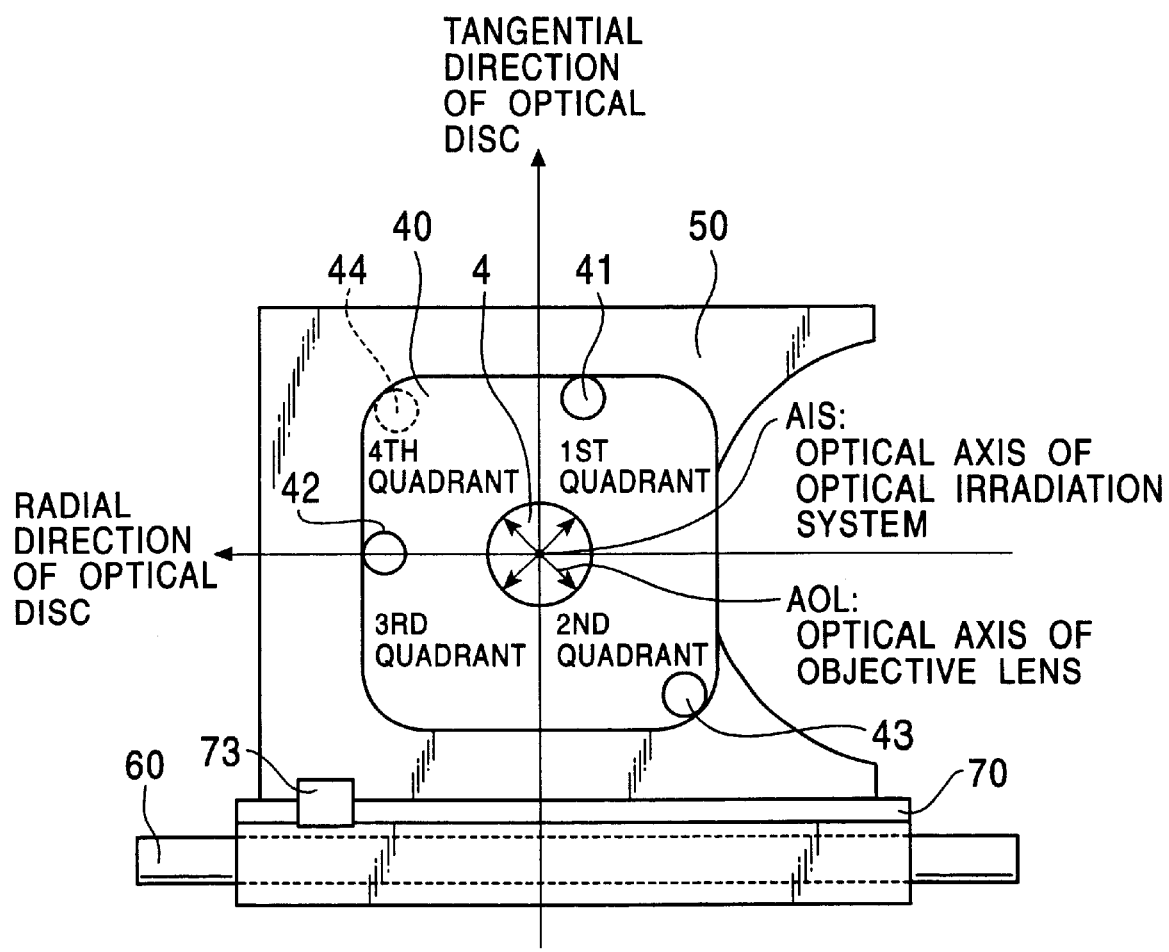
FIG. 14 is a schematic partial plan view of the optical pickup apparatus of the present invention.

FIG. 14 shows a schematically plan view of the optical pickup apparatus of this embodiment in which the surface of the main unit 50 is divided into four regions of first to fourth quadrants by the tangential and radial directions of the optical disc around the optical axis of the optical irradiation system. The objective lens unit 40 is pivotally preliminarily supported at a point at the point-of-supporting portion 43 in the second quadrant region on the main unit and is finally screwed onto the main unit 50 at the two points i.e., the tangential through-hole portion 41 and the radial through-hole portion 42. The optical axis AOL of the objective lens 4 is tilted into the second and fourth quadrants including the vertical opposite angles.

Alternatively, in another embodiment, the objective lens unit 40 may be supported at only two points, i.e., the point-of-support portion 43 and a support portion 44 (dotted line) in the fourth quadrant region, as shown in FIG. 14 so that the optical axis AOL of the objective lens 4 is tilted into the second and fourth quadrants. Further, a support point for fixing the objective lens unit may be added. In this way, this tilt-position-adjusting means should have such a structure that the objective lens unit is supported on the main unit at least two points and is screwed into a tilted position at least one point in the one region of the first to fourth quadrants defined by the tangential and radial directions of the optical disc around the optical axis of the optical irradiation system.

Figure 15:
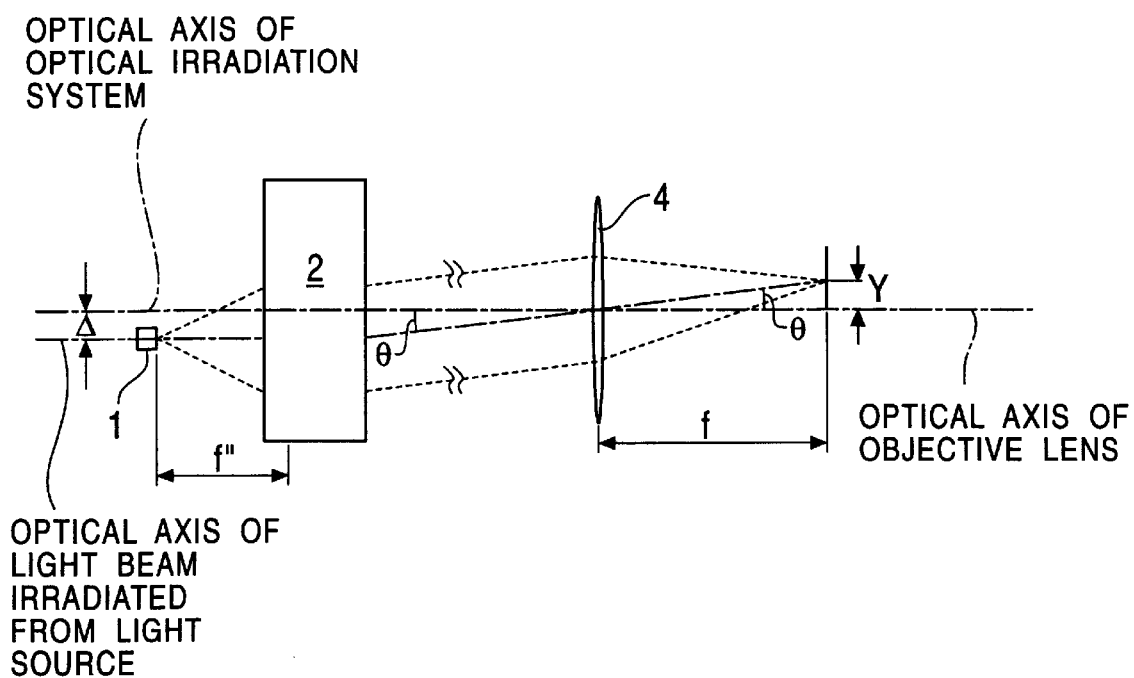
FIG. 15 is a schematic structural diagram illustrating a principle of an optical pickup apparatus in another embodiment according to the present invention for showing a relationship between the angle of view and the image height based on the light source, the collimator lens and the objective lens.

FIG. 15 shows a principle of a second embodiment in which the light irradiating portion of the semiconductor laser 1 i.e., an optical axis of a light beam irradiated therefrom is shifted parallel to the optical axis of the collimator lens 2 (i.e., the optical axis of the optical irradiation system) with a distance Δ, by which the light beam incident onto the objective lens 4 is changed by the angle of view θ so that the objective lens 4 makes an image height generate a counterbalance astigmatism for countervailing an unwanted astigmatism caused by the optical elements other than per se. In this case, the relation ship between the angle of view θ and the deviation Δ of the semiconductor laser 1 is Δ=f"·tan θ wherein f" denotes the focal distance of the collimator lens 2. Therefore, when the optical axis of light beam irradiated from the light source is shifted with respect to the optical axis of the optical irradiation system by a pertinent value and the shifted position is set, then an wanted astigmatism is minimized given by the optical elements belonging to the optical disc and the optical irradiation system and the optical detection system. The optical elements is omitted other than the semiconductor laser 1, the collimator lens 2 and the objective lens 4 in the optical irradiation system shown in FIG. 15.

Figure 16:
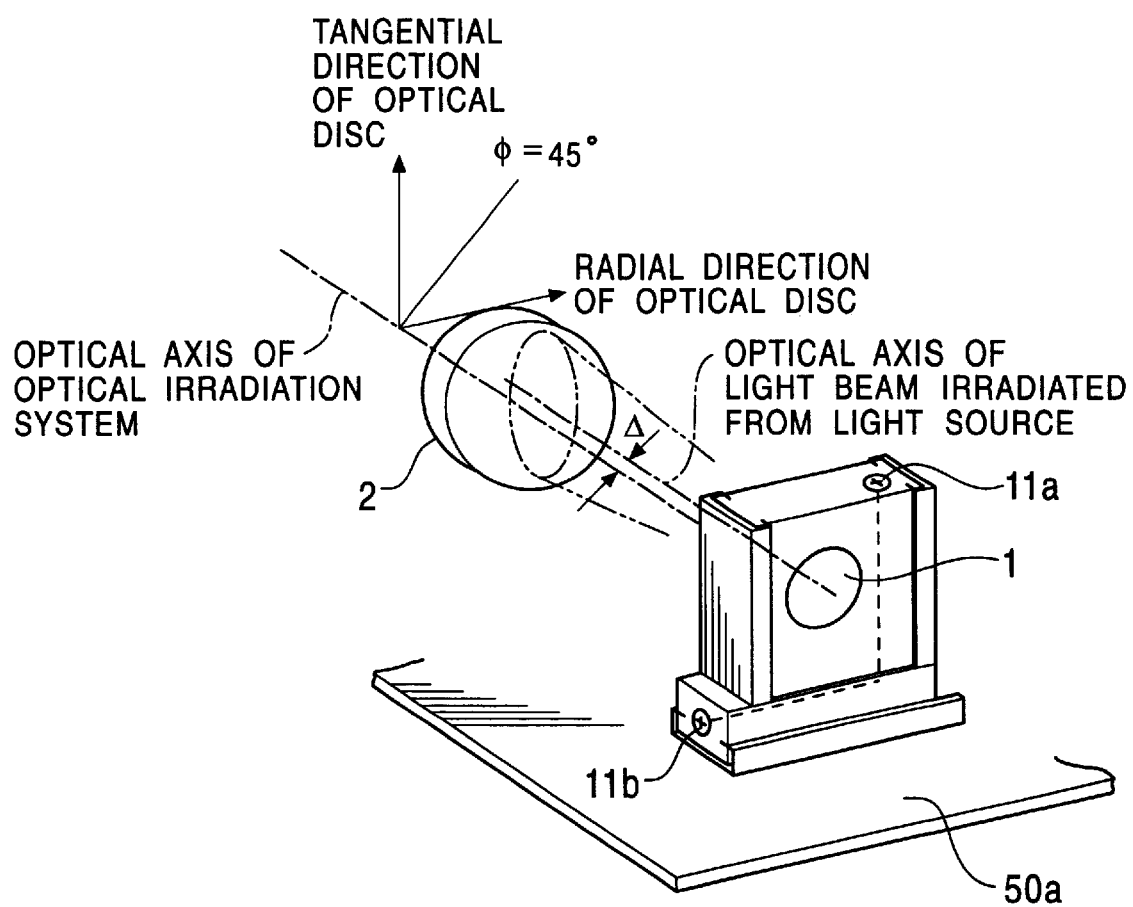
FIG. 16 is a schematic partial perspective view illustrating the light source and the collimator lens in the optical irradiation system included in the optical pickup apparatus of another embodiment according to the present invention.

FIG. 16 shows a shift-position-adjusting mechanism in which the optical axis of the light source 1 for irradiating a light beam is shifted with respect to the optical axis of the optical irradiation system by the deviation θ as a shifted position in such a way that the light source 1 supported in a sliding holder is moved in directions corresponding to the tangential and radial directions of the optical disc 5 from the optical axis of the optical irradiation system by screws 11a, 11b as screwing mechanisms individually. The rotation of screws 11a moves the light source 1 in the tangential direction of the optical disc. The rotation of screws 11b moves the light source 1 in the radial direction of the optical disc. Therefore, the optical axis of light beam irradiated from the light source is shifted in parallel from the optical axis of the optical irradiation system at an angle φ=45° direction with respect to the tangential and radial directions of the optical disc and fixed the shifted position with the deviation Δ. The angle φ can be set optionally.

Figure 17:
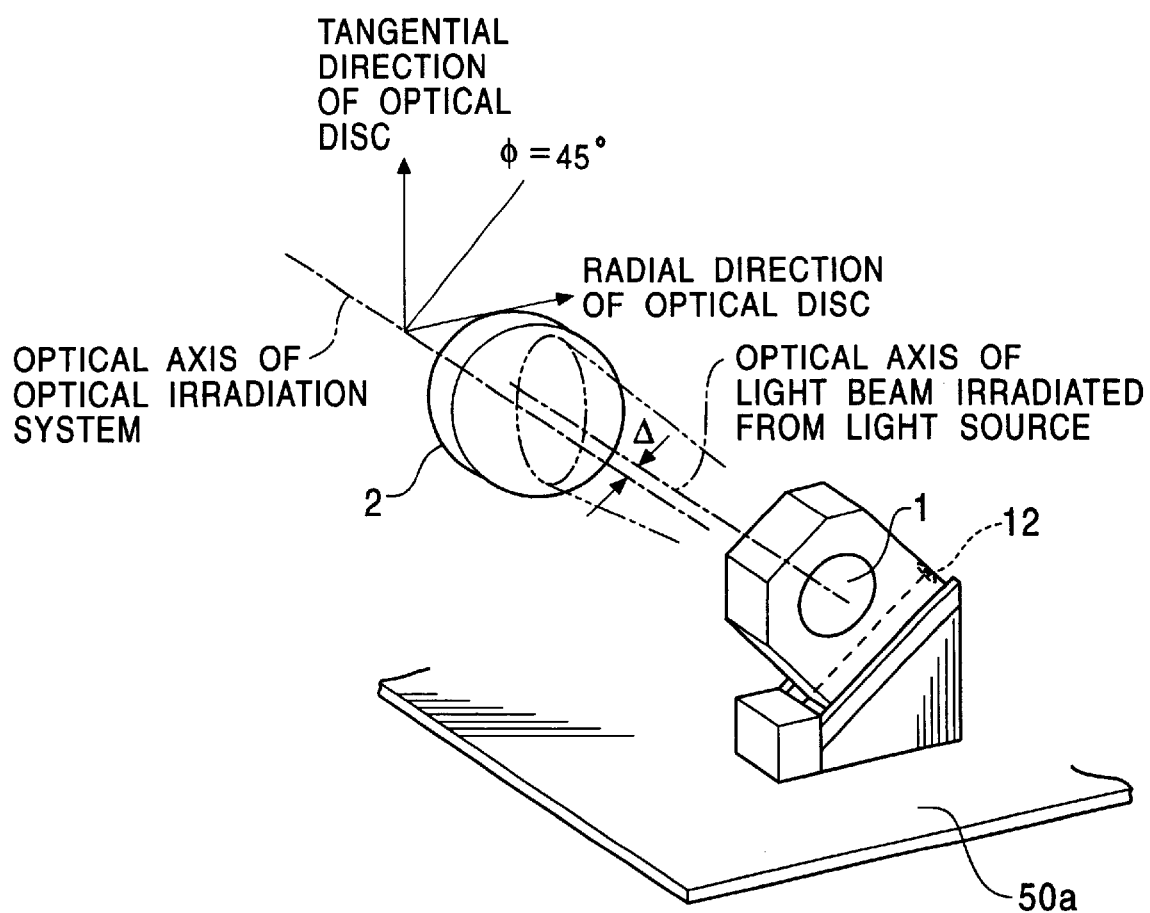
FIG. 17 is a schematic partial perspective view illustrating the light source and the collimator lens in the optical irradiation system included in the optical pickup apparatus of a further other embodiment according to the present invention.

FIG. 17 shows another shift-position-adjusting mechanism in which includes a sliding holder having slope and supporting the light source 1 to be moved in a direction φ=45° direction apart from the tangential and radial directions by rotation of a screw 12 as a screwing mechanism. In this way, the shift-position-adjusting mechanisms comprise the screwing mechanism for moving the optical axis of the light source in a direction which does not correspond to the tangential and radial directions of the optical disc 5 from the optical axis of the optical irradiation system.

According to all embodiments above mentioned, it will be obviously understood that an infinite conjugate type objective lens system (a parallel light beam type) may be employed in which a converging lens is arranged on the side of the optical recording medium and a collimator lens is arranged on the side of the semiconductor laser. Instead of the infinite conjugate type objective lens system, a finite conjugate type objective lens system may be employed in which the objective lens directly converges a diverging light beam irradiated form the laser onto the optical lens, so that there will be obtained a similar effect of the optical pickup device in the above embodiments in which, by using the tilt-position-adjusting mechanism or shift-position-adjusting mechanism above mentioned, an undesirable astigmatism caused from the optical systems is minimized. In addition, the optical pickup device according to the invention can well reproduce signals from the recorded prepits on the lands of the optical disc.

According to the present invention, there is provided the tilt-position-adjusting mechanism or shift-position-adjusting mechanism in the optical pickup device, a good performance of the optical pickup device with a diffractive limit optic system will be demonstrated since the unwanted astigmatism is cancelled as a whole the optical irradiation system.

What is claimed is:

1. An optical pickup device comprising:
    an objective lens unit having an objective lens, support means for supporting said optical lens and an objective-lens driving mechanism for driving said objective lens in a radial direction and a focusing direction of an optical disc in such a way that a light beam is focused on an information recording surface of said optical disc;
    a main unit having an optical irradiation system which includes at least one light source for emitting a light beam and guides said light beam to said objective lens, and an optical detection system which includes photosensing means and guides reflected light from said information recording surface to said photosensing means via said objective lens; and
    an unwanted astigmatism cancellation mechanism for tilting and fixing an optical axis of said objective lens with respect to an optical axis of said optical irradiation system to make the light beam obliquely enter the objective lens to provide an image height which produces an astigmatism to nearly minimize the undesirable astigmatism.

2. An optical pickup device according to claim 1, wherein said unwanted astigmatism cancellation mechanism includes a supporting structure for fixing the objective lens unit at least two points onto said main unit after the adjustment of position for tilting said objective lens unit is performed on the main unit using at least one screw at one of the points.

3. An optical pickup device according to claim 2, wherein said supporting structure is that said objective lens unit is fixed on said main unit at three points which do not lie in a straight line, at one point of which said objective lens unit is anchoringly in contact with the main unit, and at remaining two points of which the adjustments of position for said objective lens in the tilting are performed with two screws, so that the optical axis of the objective lens is tilted toward one of a pair of regions including the vertical angles of the first to fourth quadrants defined by the tangential and radial directions of the optical disc all around the optical axis of the optical irradiation system on the main unit.

4. An optical pickup device according to claim 2, wherein said supporting structure is that said objective lens unit is fixed on said main unit at two points, at one point of which said objective lens unit is anchoringly in contact with the main unit, and at a remaining points of which the adjustments of position for said objective lens in the tilting are performed with a screw, so that the optical axis of the objective lens is tilted toward one of a pair of regions including the vertical angles of the first to fourth quadrants defined by the tangential and radial directions of the optical disc all around the optical axis of the optical irradiation system on the main unit.

5. An optical pickup device according to claim 1, wherein said optical irradiation system including; a collimator lens converting a diverging light beam irradiated from the semiconductor laser to a parallel light; and a complex prism guiding the parallel light beam to the objective lens while shaping a cross-section of the light beam and having a partial function of the optical detection system as to guide a reflected light from the optical disc to said optical detection system.

6. An optical pickup device according to claim 1, wherein said photosensing means which comprises; an astigmatism generating element giving astigmatism the reflected light; and a quarter-split photosensor having at least four elements arranged in a point symmetrical to one another with respect to the center of a light-receiving surface.

7. An optical pickup device according to claim 1 further comprising a diffraction-grating element which forms two light spots from plus and minus first-order light beams that are irradiated in a point symmetrical fashion around a 0-th order light spot in a middle distance between the two light spots.

8. An optical pickup device according to claim 6, wherein said astigmatism generating element is one of selected form a cylindrical lens, hologram element and parallel transparent plate.

9. An optical pickup device according to claim 1, further comprising a tilting mechanism for tilting the main unit at an angle ($\theta C$) from a plane parallel to the optical disc.

10. An optical pickup device comprising:
    an objective lens;
    support means for supporting said optical lens;
    an objective-lens driving mechanism for driving said objective lens in a radial direction and a focusing direction of an optical disc in such a way that a light beam is focused on an information recording surface of said optical disc;
    an optical irradiation system which includes at least one light source for emitting a light beam and guides said light beam to said objective lens;
    an optical detection system which includes photosensing means and guides reflected light from said information recording surface to said photosensing means via said objective lens; and
    an unwanted astigmatism cancellation mechanism for shifting said light source with respect to an optical axis of said optical irradiation system to make the light beam obliquely enter the objective lens to provide an image height which produces an astigmatism to nearly minimize the undesirable astigmatism.

11. An optical pickup device according to claim 10, wherein said unwanted astigmatism cancellation mechanism including screwing mechanisms for moving the optical axis of the light source in directions corresponding to the tangential and radial directions of the optical disc from the optical axis of the optical irradiation system individually.

12. An optical pickup device according to claim 10, wherein said unwanted astigmatism cancellation mechanism including a screwing mechanism for moving the optical axis of the light source in a direction which does not correspond to the tangential and radial directions of the optical disc from the optical axis of the optical irradiation system.

13. An optical pickup device according to claim 10, wherein said optical irradiation system including; a collimator lens converting a diverging light beam irradiated from the semiconductor laser to a parallel light; and a complex prism guiding the parallel light beam to the objective lens while shaping a cross-section of the light beam and having a partial function of the optical detection system as to guide a reflected light from the optical disc to said optical detection system.

14. An optical pickup device according to claim 10, wherein said photosensing means which comprises; an astigmatism generating element giving astigmatism the reflected light; and a quarter-split photosensor having at least four elements arranged in a point symmetrical to one another with respect to the center of a light-receiving surface.

15. An optical pickup device according to claim 10 further comprising a diffraction-grating element which forms two light spots from plus and minus first-order light beams that are irradiated in a point symmetrical fashion around a 0-th order light spot in a middle distance between the two light spots.

16. An optical pickup device according to claim 14, wherein said astigmatism generating element is one of selected form a cylindrical lens, hologram element and parallel transparent plate.

17. An optical pickup device according to claim 10, further comprising a tilting mechanism for tilting the main unit at an angle ($\theta C$) from a plane parallel to the optical disc.

* * * * *